(12) United States Patent
Ashihara

(10) Patent No.: US 6,690,260 B1
(45) Date of Patent: Feb. 10, 2004

(54) DRIVER AUTHENTICATION APPARATUS AND METHOD FOR IDENTIFYING AUTOMATICALLY-EXTRACTED DRIVER'S OPERATION FEATURE DATA WITH ALREADY-REGISTERED FEATURE DATA

(75) Inventor: Jun Ashihara, Wako (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 583 days.

(21) Appl. No.: 09/644,950

(22) Filed: Aug. 23, 2000

(30) Foreign Application Priority Data

Aug. 25, 1999 (JP) .......................................... 11-238944

(51) Int. Cl.7 ............................................. G05B 19/00
(52) U.S. Cl. ..................... 340/5.8; 340/5.2; 340/5.72; 701/35; 701/36; 701/49; 477/159; 477/183; 477/184; 477/186
(58) Field of Search ..................... 340/5.8, 5.2, 5.72; 701/35, 49; 477/159, 183, 184, 186; 702/94

(56) References Cited

U.S. PATENT DOCUMENTS

| 5,499,182 A | * | 3/1996 | Ousborne | ................. | 701/35 |
| 6,122,580 A | * | 9/2000 | Autermann | ................ | 701/49 |
| 6,449,572 B1 | * | 9/2002 | Kurz et al. | ................ | 702/94 |

FOREIGN PATENT DOCUMENTS

| JP | 03107354 | 5/1991 |
| JP | 08140294 | 5/1996 |
| JP | 10301755 A | 11/1998 |
| JP | 11122162 A | 4/1999 |
| JP | 11136911 | 5/1999 |
| WO | WO 94/01916 | 1/1994 |
| WO | WO 99/33156 | 7/1999 |

* cited by examiner

Primary Examiner—Michael Horabik
Assistant Examiner—Yves Dalencourt
(74) Attorney, Agent, or Firm—Carrier, Blackman & Associates, P.C.; Joseph P. Carrier; William D. Blackman

(57) ABSTRACT

A driver authentication apparatus and method permits a vehicle driver to be identified using a simpler method without using an ID card or the like, and without performing any special operation. The apparatus has a feature amount storing section for storing preset feature data of each registered driver; an operation detecting section for detecting an operation performed by the driver, and outputting data indicating details of the operation; and a feature data managing section for storing the data output from the operation detecting section and generating operation feature data of the driver based on the stored data, and comparing the operation feature data with the preset feature data stored in the feature amount storing section and determining any identity between the compared operation and preset feature data.

15 Claims, 5 Drawing Sheets

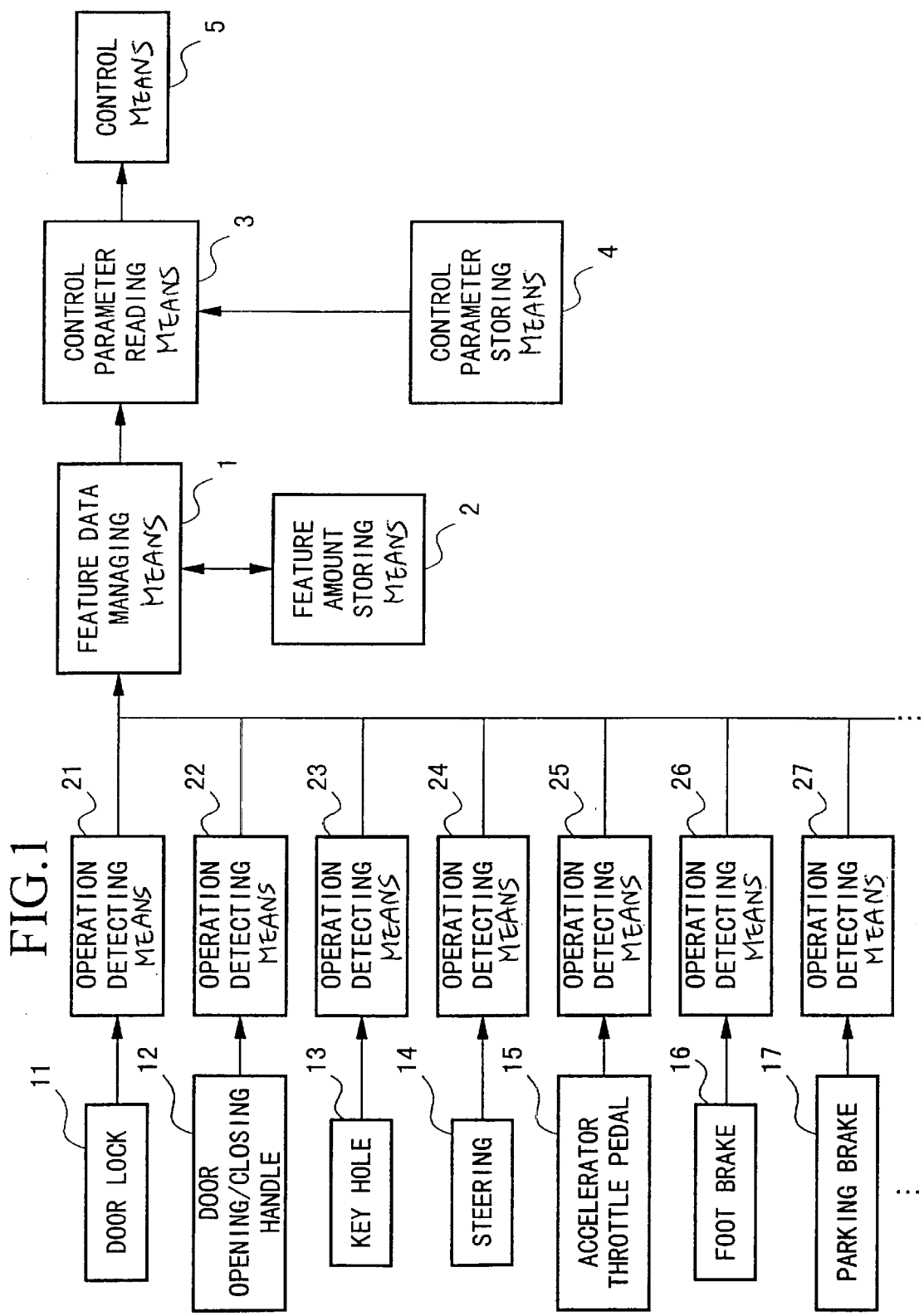

(a)

(b)

(a)

(b)

(c)

DRIVER AUTHENTICATION APPARATUS AND METHOD FOR IDENTIFYING AUTOMATICALLY-EXTRACTED DRIVER'S OPERATION FEATURE DATA WITH ALREADY-REGISTERED FEATURE DATA

BACKGROUND OF THE INVENTION

1. Field of the Invention

The present invention relates to a driver authentication apparatus and method for identifying and authenticating a car driver or the like.

This application is based on Patent Application No. Hei 11-238944 filed in Japan, the contents of which are incorporated herein by reference.

2. Description of the Related Art

Recently, cars have gradually come to employ (i) controls suitable for the personality or taste of the driver who drives the car, or (ii) driver authentication for crime prevention, and thus identification of the driver is necessary. Therefore, driver identification having a simple operation and a high accuracy has been required.

Conventionally, such driver identification is performed using an ID key or ID card. As an example, Japanese Unexamined Patent Application, First Publication, Hei 11-122162 discloses a system in which ID information on the driver and all passengers is registered using ID cards when they get into the car, and if a telephone call or the like is received while driving, the addressee of the call (that is, the driver, or another passenger) is detected so as to perform an information distribution control.

On the other hand, in order to perform the driver authentication without an ID key or ID card, fingerprints or voice data (i.e., voiceprints), known as general individual authentication means, may be employed.

The conventional example using an ID key or ID card has the problem such that if the ID key or ID card is illegally acquired and used, or if the driver changes while driving, then authentication is not accurately performed. On the other hand, in conventional examples using fingerprints or voiceprints, an additional operation (which is generally unnecessary) is imposed on the driver, which is troublesome for the driver.

SUMMARY OF THE INVENTION

In consideration of the above circumstances, an objective of the present invention is to provide a driver authentication apparatus and method employing a simpler method for identifying and directly authenticating the driver without using an object such as an ID key or ID card and without a specific additional operation for the driver.

Therefore, the present invention provides a driver authentication apparatus for authenticating a driver who drives a vehicle, comprising:

- a feature amount storing section for storing preset feature data of each registered driver;
- an operation detecting section for detecting an operation performed by the driver, and outputting data indicating details of the operation; and
- a feature data managing section for storing the data output from the operation detecting section and generating operation feature data of the driver based on the stored data, and comparing the operation feature data with the present feature data stored in the feature amount storing section and determining any identity between the compared operation and preset feature data.

The data output from the operation detecting section may include an operation amount or degree of the operation.

The present apparatus may comprise a plurality of operation detecting sections for detecting operations performed by the driver, and outputting data indicating details of each operation, and wherein the feature data managing section stores the data output from each operation detecting section and generating the operation feature data of the driver by extracting and combining some of the stored data.

Typically, the present apparatus includes a computer system, and the operation of the feature data managing section is realized by executing the steps of a program, loaded from a storage medium, by the CPU of the computer system. The feature amount storing section can be realized by using a storage medium in the computer system, and effective data reading/storing operations can be performed by using a database function provided in the computer system. The operation detecting section(s) detect a physical motion or the like of each operation portion, and transmit the detected result via a signal line to the CPU.

In the present invention, it is possible to identify the actual driver with one of the already-registered drivers based on features extracted with reference to the general driving operations of the driver, thereby authenticating the driver without an ID key or ID card, and without the driver performing any addition special operation.

The present apparatus may further comprise:

- a control parameter storing section for storing control parameters specific to each of the registered drivers; and
- a control parameter reading section for reading out the control parameters specific to the driver identified by the feature data managing section from the control parameter storing section.

Preferably, the control parameter storing section is realized by using a rewritable nonvolatile memory in the above computer system, and the data in the memory can be read out by the control parameter reading section provided in the CPU in the computer system.

Accordingly, the control parameters which are necessary for driving the vehicle and are specific to the identified driver can be used, thereby performing driving control suitable for the taste or driving characteristics of the driver. In addition, the driver's operations can be simplified, and a useful effect such as raising an alarm or crime prevention can be obtained.

The present invention also provides a driver authentication method (corresponding to the above driver authentication apparatus) for authenticating a driver who drives a vehicle, comprising:

- a feature amount storing step for storing preset feature data of each registered driver;
- an operation detecting step for detecting an operation performed by the driver, and outputting data indicating details of the operation; and
- a feature data managing step for storing the data output in the operation detecting step and generating operation feature data of the driver based on the stored data, and comparing the operation feature data with the present feature data stored in the feature amount storing step and determining any identity between the compared operation and preset feature data.

The present invention also provides a computer-readable storage medium storing a control program executed by a computer in a driver authentication apparatus for authenticating a driver who drives a vehicle, the program comprising:

an operation storing means for inputting and storing data indicating details of an operation performed by the driver;

a feature data generating means for generating operation feature data of the driver based on the data stored by the operation storing means, according to a predetermined data generating procedure; and a driver identifying means for comparing the feature data generated in the feature data generating means with preset feature data which has already been stored in a storage medium, and determining any identity between the compared operation and preset feature data.

The data input and stored by the operation storing means may include an operation amount or degree of the operation.

Data indicating details of a plurality of operations performed by the driver may be input and stored by the operation storing means; and, some of the data stored by the operation storing means may be extracted and combined by the feature data generating means so as to generate the operation feature data.

Typically, the above driver authentication apparatus has a computer system, and the CPU of the computer system loads and executes the present control program stored in the storage medium. According to the control program, it is possible to identify the actual driver with one of the already-registered drivers based on features extracted with reference to the general driving operations of the driver, thereby authenticating the driver.

The control program may further comprise a control parameter reading means for reading out control parameters specific to the driver identified by the driver identifying means, from a storage device for storing control parameters specific to each of registered drivers.

Accordingly, the control parameters specific to the identified driver can be read out, thereby performing automatic vehicle control specific to and suitable for the driver by using the control parameters.

DESCRIPTION OF THE PREFERRED EMBODIMENTS

Hereinafter, an embodiment according to the present invention will be explained in detail with reference to the drawings.

Figure 1:
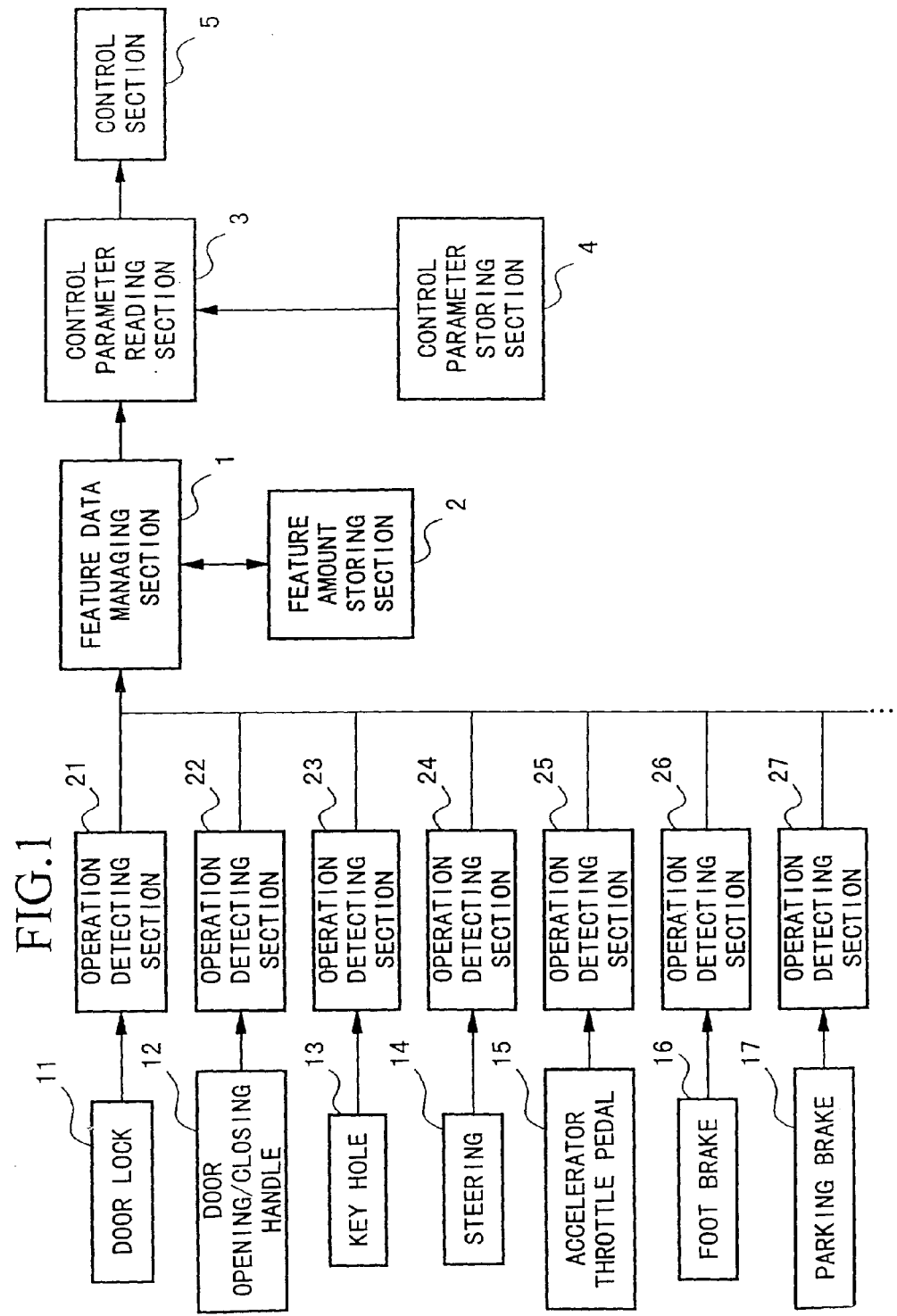
FIG. 1 is a block diagram showing the structure of an embodiment of the driver authentication apparatus according to the present invention.

FIG. 1 is a block diagram showing the structure of the driver authentication apparatus as an embodiment of the present invention. In the figure, reference numeral 1 indicates a feature data managing section, reference numeral 2 indicates a feature amount storing section, reference numeral 3 indicates a control parameter reading section, reference numeral 4 indicates a control parameter storing section, and reference numeral 5 indicates a control section. Reference numeral 11 indicates a door lock, reference numeral 12 indicates a door opening/closing handle, reference numeral 13 indicates a key hole, reference numeral 14 indicates a steering wheel, reference numeral 15 indicates an accelerator throttle pedal, reference numeral 16 indicates a foot brake, and reference numeral 17 indicates a parking brake. Reference numerals 21 to 27 indicate operation detecting sections related to these operation parts 11 to 17. More specifically, each operation detecting section detects the operation degree (or amount) or the ON/OFF state of each operation part according to the driver's operation, and outputs detected data to the feature data managing section 1.

The feature data managing section 1 receives data from operation detecting sections 21 to 27, or another operation detecting section related to another operation part (not shown), and stores the data together with relevant temporal (time) information. According to the current driving situation, the data information managing section 1 extracts various feature amounts related to the driver's operation from among the stored data. The extracted feature amounts may include an operational amount itself, operational speed of an operation, information on the operation order from an operation to another operation, the time between the execution times of one operation and another operation, a period of a series of operations, and the like.

Figure 2:
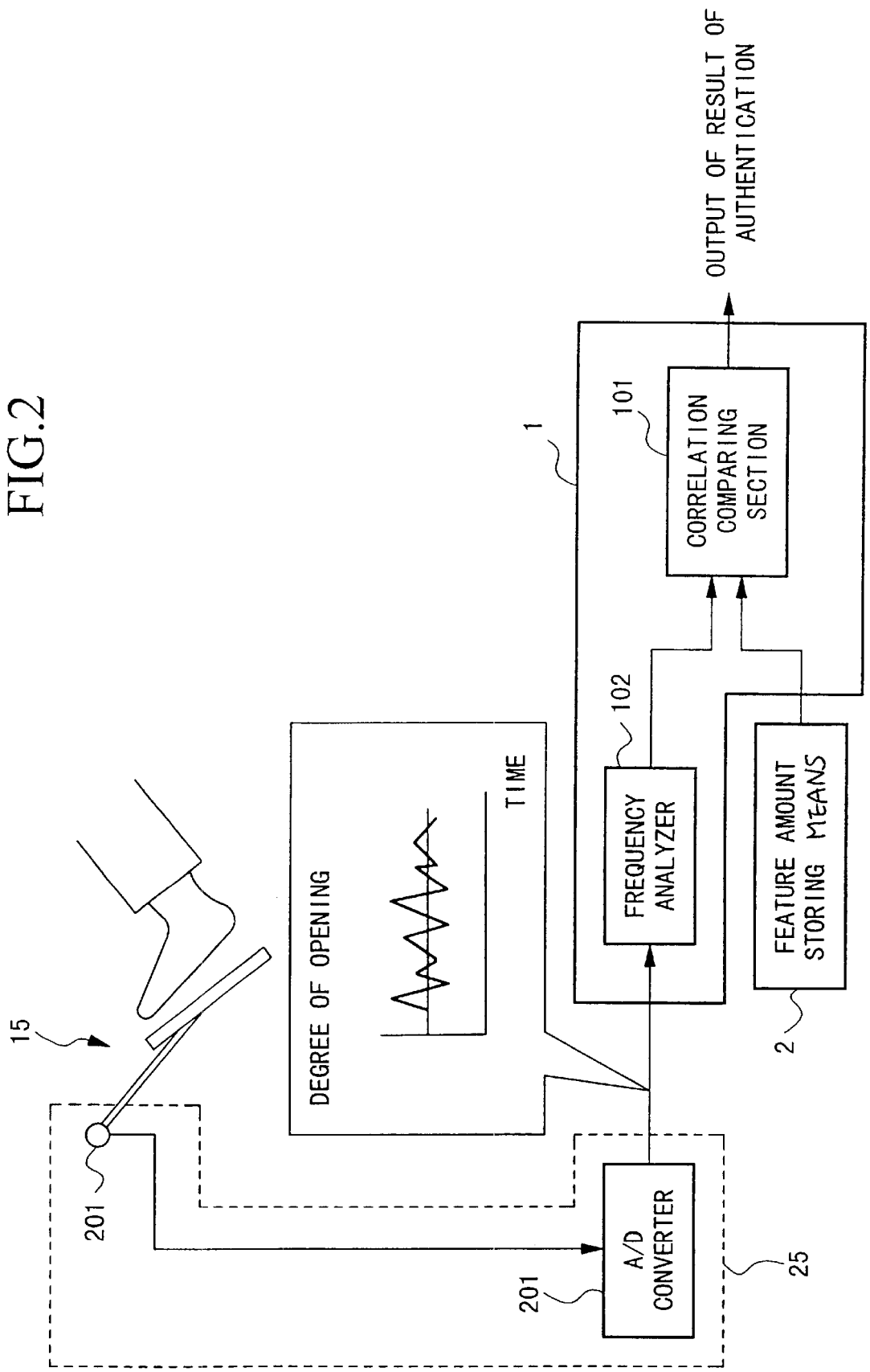
FIG. 2 is a block diagram showing the structure of the authentication system using the operation degree of the accelerator throttle pedal in the embodiment.

An example of the operation detection will be explained below. FIG. 2 is a block diagram showing the system structure related to the operation detection of the accelerator throttle pedal 15, one of the operation parts in the present apparatus, and to the relevant feature comparison. The degree of depression of the accelerator throttle pedal 15 by the driver is detected by depression detector 201 provided in the operation detecting section 25, and the detected analog data is transmitted from the detector to A/D converter 202. The A/D converter 202 converts the analog data to a digital-value signal, and sends the signal to frequency analyzer 102 provided in the feature data managing section 1.

The frequency analyzer 102 continuously receives data of the depression degree, and performs the Fourier transform of the data, thereby obtaining frequency spectral data. The method of comparing feature data using the frequency spectrum will be explained later. Below, specific examples of the operation detection of the other operation parts and the extraction of the feature amounts will be explained.

The first specific example of the feature amount related to the opening and closing operation of the door lock is the time from the time when the door lock 11 is opened to the time when the door is opened by operating the door opening/closing handle 12. This feature time is calculated by the feature data managing section 1 based on data sent from the operation detecting section 21 of the door lock 11, data sent from the operation detecting section 22 of the door opening/closing handle 12, and the relevant temporal information. The second specific example is the time from the time when the key is pulled out of key hole 13 to when the door is opened by operating the door opening/closing handle 12. The third specific example is the time from when the door is closed to the time when the door is locked by operating the door lock 11. Each feature amount is calculated based on data sent from relevant operation detecting sections (21–27) to the feature data managing section 1.

The next feature amounts relate to the engine starting operation. A specific example is the order of the driver's operations of (i) closing (or shutting) the door after the driver takes the driver's seat, (ii) putting on the seat belt, (iii) inserting the key into the key hole, and (iv) rotating the key from the insertion position to the ignition point. Other specific examples are the intervals between each of the above operations, the rotational speed of the key at the ignition, the position of the AT lever (if the car is an AT (automatic transmission) type), and the like.

The next feature amounts relate to the initial starting procedure. A specific example is the order of the driver's operations of (i) shifting the position of the AT lever (when the car is of the AT type), (ii) operating the shift lever (when the car is of the MT (manual transmission) type), (iii) depressing the foot brake, and (iv) releasing the parking brake. Other specific example are the intervals between each of the above operations, and the like. A typical operation order for starting a MT car is:

(A) operating the shift lever→depressing the foot brake→releasing the parking brake, (B) depressing the foot brake→releasing the parking brake→operating the shift lever, and (C) depressing the foot brake→operating the shift lever→releasing the parking brake.

The driver's selection of one of the above patterns (A) to (C) is one of the individual operation features.

The next feature amounts relate to the steering operation. Specific examples are the amount (degree), speed, and timing of steering-wheel operations in various driving situations such as turning right or left or changing lanes when taking a curve or turning at a crossing.

The next feature amounts relate to the operation of waiting for a traffic light. Specific examples are the position of the AT lever during the waiting (when the car is an AT type), the position of the shift lever (when the car is an MT type), the timing between the lever operation and the stopping/starting of the car, and the like.

The next feature amounts relate to the car action as a result of each driving operation. Specific examples are acceleration in an accelerating or decelerating operation, and the yaw rate.

The feature data managing section 1 suitably combines some of the above feature amounts so as to identify the driver according to the following method. In the above explanations, typical examples of the feature amounts are listed; however, other features relating to driving operation and indicating the driver's characteristics or personality may be used. Actually, not all of the explained feature amounts are used, but only selected feature amounts suitable for the identification may be used according to the current conditions.

Below, the procedure of the driver identification by using the present apparatus will be explained.

Figure 3:
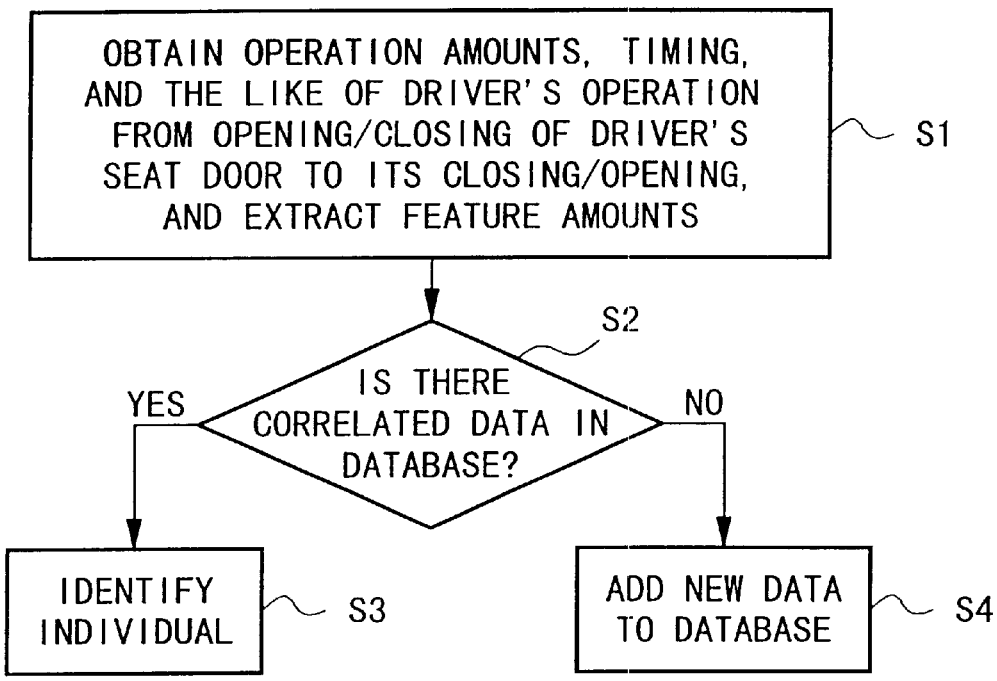
FIG. 3 is a flowchart showing the operation of driver authentication system using open and closing of the driver's seat door in the embodiment.

FIG. 3 is a flowchart showing the operation of extracting the relevant features and identifying the driver by collating the extracted data with data of the feature amount storing section 2.

In the first step S1 of FIG. 3, the feature data managing section 1 obtains data (or results) related to the driver's operation, which are detected by the operation detecting sections 21, . . . from the time when the door at the driver's seat side is opened or closed to the time when the door is closed or opened again. The managing section 1 stores the obtained data together with relevant time information, and then extracts relevant feature amounts as explained above. In the next step S2, the feature data managing section 1 searches the feature amount storing section 2, so as to determine whether the driver corresponding to the combination of the feature amounts extracted in the above step S1 has been registered.

Figure 4:
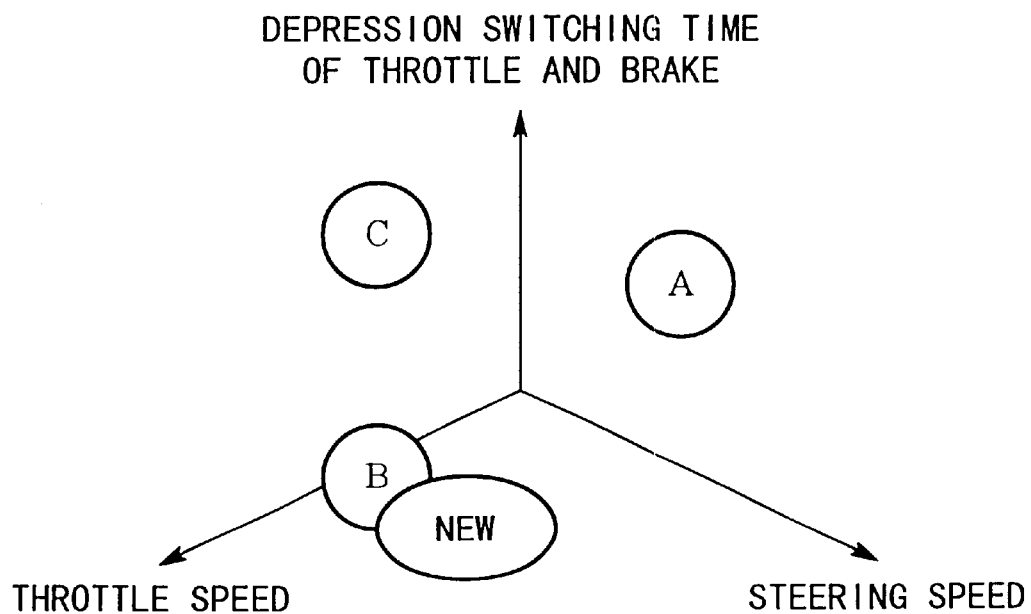
FIG. 4 is a diagram showing the concept of a characteristic space of the operation of the driver to be identified in the embodiment.
Figure 5:
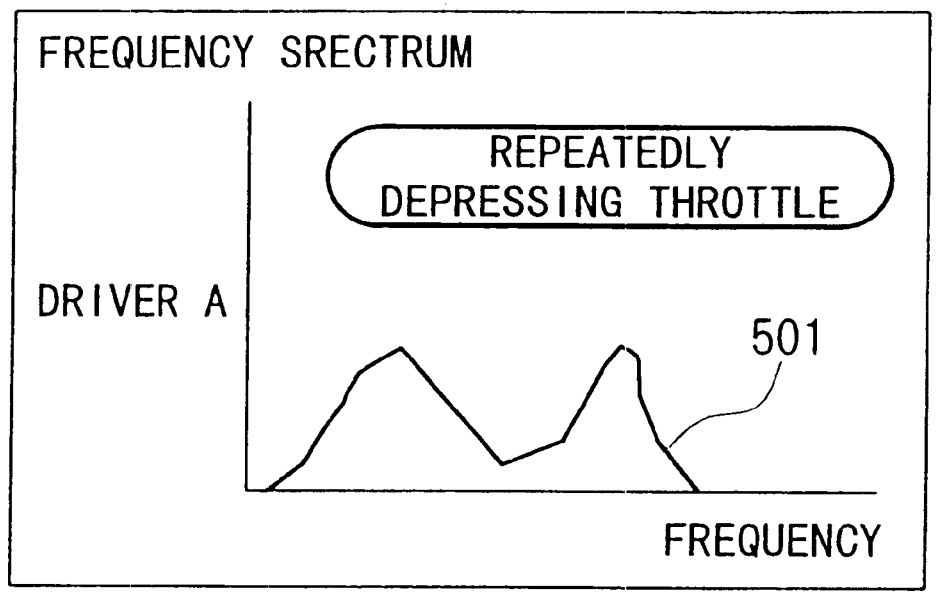
FIGS. 5A and 5B are graphs showing feature data samples stored in the feature amount storing section in the embodiment.
Figure 5:
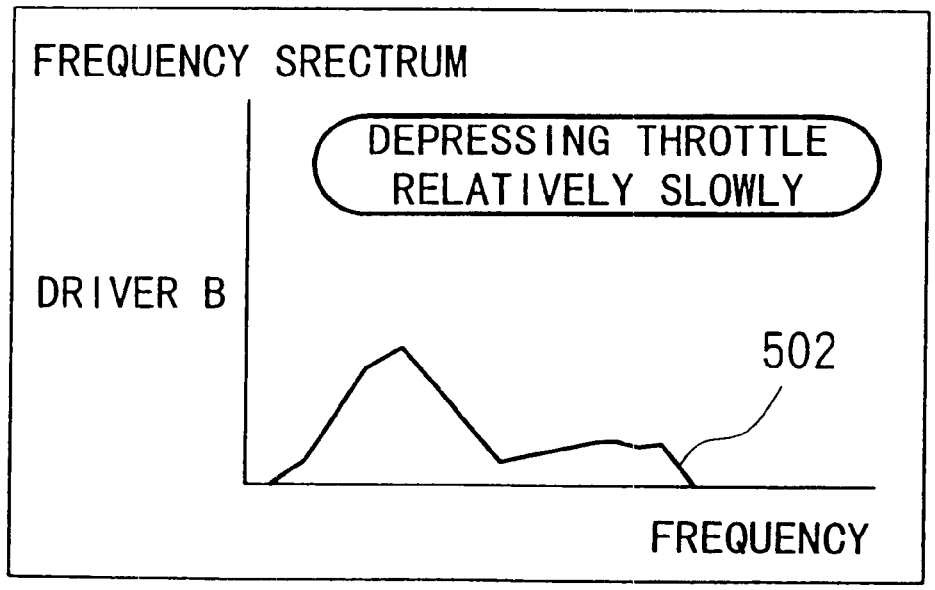
Figure 6:
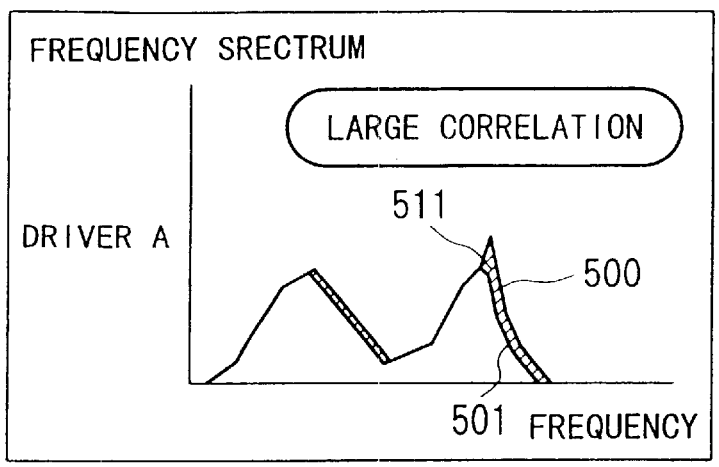
FIGS. 6A to 6C are graphs showing a correlative comparison of feature data in the embodiment.
Figure 6:
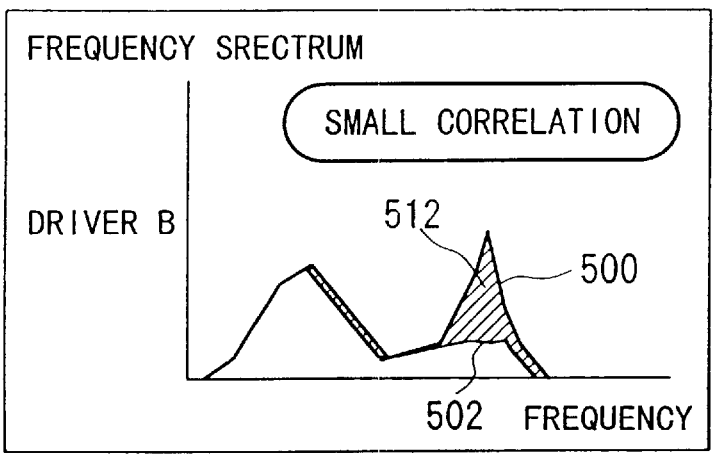
Figure 6:
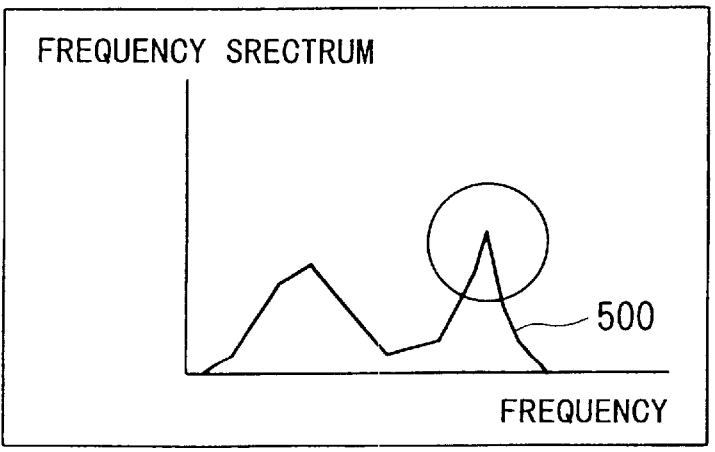

FIG. 4 is a diagram showing the concept of a characteristic space of the driver's operation. The shown characteristic space is a three-dimensional space. However, actually, a multi-dimensional space is considered according to the number of feature mounts used. In FIG. 4, the spheres indicated by reference symbols A, B, and C correspond to sampled values indicating drivers registered in the feature amount storing section 2. If the operation features of the current driver who has started the car overlap the area of sphere A, it is recognized that the driver is the same person who has already been registered as driver A. If the current driver does not correspond to any one of spheres A, B, and C, then it is recognized that the current driver is a new driver.

The actual comparison method will be explained in an example related to the frequency spectrum of the depressing amount (degree) of the accelerator throttle pedal. The correlation comparing section 101 in FIG. 2 compares data obtained from the frequency analyzer 102 with data stored in the feature amount storing section 2.

Figure 5A:
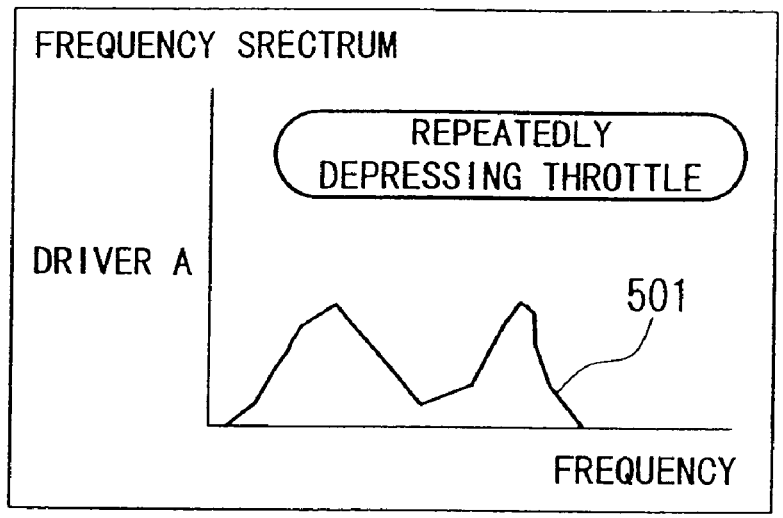
Figure 5B:
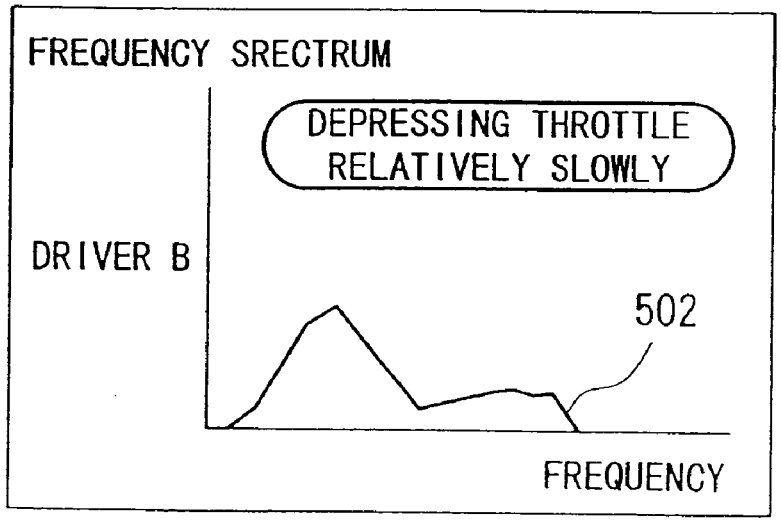

FIGS. 5A and 5B show data related to two drivers A and B registered in the feature amount storing section 2. In FIG. 5A, reference numeral 501 indicates a frequency spectral curve for driver A, belonging to a type who repeatedly depresses the accelerator throttle pedal 15 with a relatively short period. On the other hand, in FIG. 5B, reference numeral 502 indicates a frequency spectral curve for driver B, belonging to a type who slowly depresses the accelerator throttle pedal over a relatively long period. By comparing the data of both drivers, a feature that a peak is present at the lower frequency side is common for curves 501 and 502, but only curve 501 has another peak at the higher frequency side.

Figure 6A:
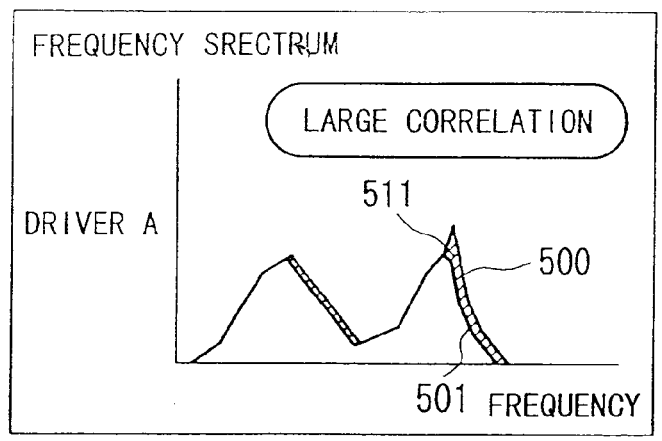
Figure 6B:
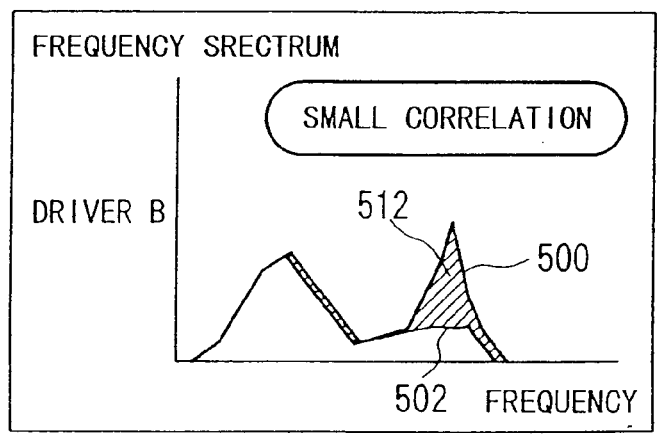
Figure 6C:
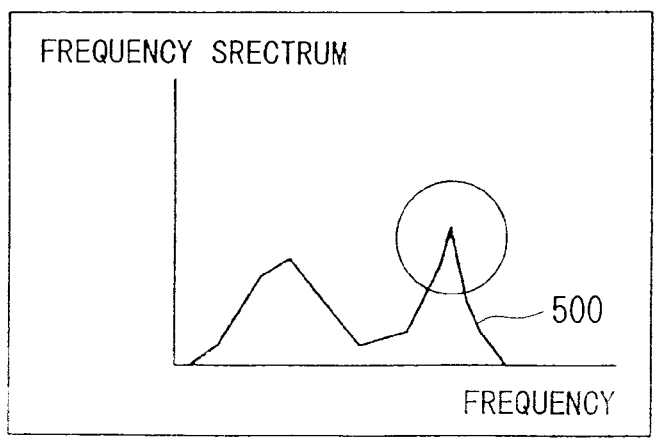

FIGS. 6A to 6C are graphs for showing comparison of feature data. In FIG. 6C, curve 500 indicates data input from the frequency analyzer 102, and as shown by the portion surrounded by a circle, this curve has a peak at the higher frequency side. The curves 501 and 502 in FIGS. 6A and 6B respectively correspond to data of drivers A and B stored in the feature amount storing section 2.

In order to detect which driver's data (stored in the feature amount storing section 2) agrees with the data input from the frequency analyzer 102, the correlation comparing section 101 calculates the definite integral of the absolute values of the difference between the input frequency spectral data and each stored frequency spectral data within a predetermined frequency range.

In FIGS. 6A and 6B, the above curve 500 is also shown. The above definite integral corresponds to area 511 surrounded by curves 500 and 501, and area 512 surrounded by curves 500 and 502. In this example, curve 500 has a peak at the higher frequency side; thus, curve 501 has a higher correlation value in comparison with curve 502, so that the calculated value of the above definite integral is smaller. Accordingly, the definite integral value can be regarded as the distance in the dimension of the operation of the accelerator throttle pedal in the above-explained characteristic space; thus, the correlation comparing section 101 can calculate the distance using a mathematical procedure.

As explained above, the distance in the characteristic space can be calculated with respect to the operation of the accelerator throttle pedal. As for the other operations, a similar distance is defined in advance, and the feature data managing section 1 calculates the distance. The feature data managing section 1 registers the feature data of each driver related to each operation part, and identifies the driver by comparing feature data of a plurality of operation parts. In order to improve the identification accuracy, each registered data is suitably weighed when the data is used. In addition, the possible amount range may be defined for each driver and be stored in the feature amount storing section 2.

In step S2 in FIG. 3, if the features of the current driver agree with those registered in the feature amount storing section 2, the individual (i.e., driver) is identified in step S3, and the identified result is communicated to the control parameter reading section 3. The reading section 3 reads out the control parameters related to the identified driver from the control parameter storing section 4, and transfers the read data to control section 5. The control section 5 then performs the vehicle control suitable for the identified driver.

If no corresponding data is found in step S2, then in step S4, the feature data managing section 1 newly registers the feature amounts of the current driver as new data in the feature amount storing section 2, and informs the control parameter reading section 3 of the new registration. In this case, the control parameter reading section 3 reads out default control parameters and transfers them to control section 5. In the procedure shown in FIG. 3, after the operation features from the opening/closing (locking) of the door at the driver's seat to the next closing/opening are extracted, the extracted data are collated with the preset data stored in the feature amount storing section 2. However, the driver's identification may be performed during the series of operations (from the opening of the door), and the control parameters suitable for the driver may be used for controlling the vehicle in the following operations. In addition, after the driver is identified, the driver may be re-identified by performing the feature extraction authentication method again. Furthermore, even after the driver is identified, data of the driver stored in the feature amount storing section 2 may be updated with data obtained by performing the feature extraction method again.

Below, an example control using the driver's individual authentication information obtained by the above-explained method will be explained.

The first usage is adjustment of the position of the driver's seat, rear view mirror, door mirror, steering wheel, and the like. It is assumed that the present car is driven by one of several specific drivers. The driver can be identified by the operation features from the door opening to the driver's seat adjustment; thus, automatic adjustment is possible by registering relevant position data suitable for (the body of) each driver in the control parameter storing section 4 in advance.

The next usage is selection of the shift timing schedule of the AT car. A combination of conditions such as the driving speed, engine speed, gradient of a slope, and the like relating to the shift-up or shift-down operation may be defined in advance according to the driving characteristics or taste of each driver. In this case, when the driver is identified by the feature extraction according to the present invention, a shift time schedule suitable for the driver can be employed, thereby driving the car with the shift time schedule specific to the driver, without performing a special selecting operation.

The next usage is giving alarms during driving, suitable for the driver. For example, in a car comprising an alarming device for detecting danger based on the distance to a car ahead of the present car, and informing the driver of the danger, it is preferable to choose one of the following operations according to the driving experience of the driver, or the like: the first operation is to issue an alarm to the driver for each detailed matter, and the second operation is to issue an alarm to the driver only for a serious matter. In addition, it may be effective for a driver to issue alarms only for specific matters. When the driver is identified by the feature extraction, the alarm pattern can be determined according to the identified result. Therefore, no special operation is necessary and thus this is convenient.

The next usage is security. In the present apparatus, data for possible drivers who may drive the car can be stored in advance in the feature amount storing section 2. If it is determined that a driver corresponding to no registered data is currently driving the car, then the fact may be recorded, an alarm may be issued to the driver, a display means which can be observed from the outside may be used, or a communicating means or the like may be used. Therefore, it is possible to promptly detect a car theft or prevent the theft from occurring.

The identification result of the present apparatus can be applied to various usages relating to the driver authentication, other than those explained above.

The above driver authentication apparatus may include a computer system having an input/output subsystem for sending and receiving data to and from each operation detecting section and each portion to be controlled. The above-explained control steps which relate to the driver identification and which are suitably performed for each identified driver are stored in a storage medium using a programmed format in the computer system, and the control operations are performed by loading and executing the program by the computer. The storage medium of the computer system may be a floppy disk, magnet optical disk, CD-ROM, magnet hard disk, or semiconductor memory, that is, the kind of the storage medium is not limited here.

Although there have been described in detail what are at present considered to be the preferred embodiments of the invention, it will be understood by persons skilled in the art that variations and modifications may be made thereto without departing from the gist, spirit or essence of the invention. The scope of the invention is indicated by the appended claims.

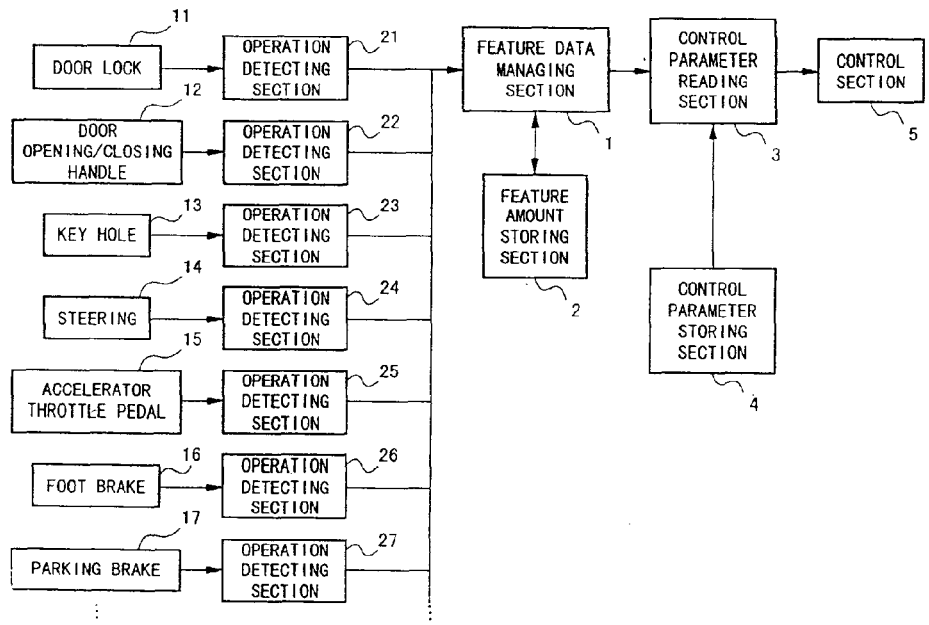

What is claimed is:

1. A driver authentication apparatus for authenticating a driver who drives a vehicle, comprising:

a feature amount storing section for storing preset feature data of a plurality of registered drivers;

an operation detecting section for detecting an operation performed by the driver, and outputting data indicating details of the operation; and a feature data managing section for storing the data output from the operation detecting section, generating operation feature data of the driver based on the stored data, comparing the operation feature data with the preset feature data stored in the feature amount storing section, and determining any identity between the compared operation and preset feature data.

2. A driver authentication apparatus as claimed in claim 1, wherein the data output from the operation detecting section includes at least one of an operation amount and a degree of the operation.

3. A driver authentication apparatus as claimed in claim 1, comprising a plurality of operation detecting sections for detecting operations performed by the driver, and outputting data indicating details of each operation, and wherein the feature data managing section stores the data output from each operation detecting section and generating the feature data of the driver by extracting and combining some of the stored data.

4. A driver authentication apparatus as claimed in claim 1, further comprising:

a control parameter storing section for storing control parameters specific to each of the registered drivers; and a control parameter reading section for reading out the control parameters specific to the driver identified by the feature data managing section from the control parameter storing section.

5. A driver authentication method for authenticating a driver who drives a vehicle, comprising:

a feature amount storing step for storing preset feature data of each registered driver;

an operation detecting step for detecting an operation performed by the driver, and outputting data indicating details of the operation; and a feature data managing step for storing the data output from the operation detecting step, generating operation feature data of the driver based on the stored data, comparing the operation feature data with the preset feature data stored in the feature amount storing step, and determining any identity between the compared operation and preset feature data.

6. A driver authentication method as claimed in claim 5, wherein the data output in the operation detecting step includes at least one of an operation amount and a degree of the operation.

7. A driver authentication method as claimed in claim 5, wherein:

in the operation detecting step, a plurality of operations performed by the driver are detected, and data indicating details of each said operation are output, and in the feature data managing step, said output data indicating details of each said operation are stored and the operation feature data of the driver are generated by extracting and combining some of the stored data.

8. A driver authentication method as claimed in claim 5, further comprising:

a control parameter storing step for storing control parameters specific to each of the registered drivers; and a control parameter reading step for reading out the control parameters, stored in the control parameter storing step, specific to a driver as identified in the feature data managing step.

9. A computer-readable storage medium storing a control program to be executed by a computer in a driver authentication apparatus for authenticating a driver who drives a vehicle, the program comprising:

an operation storing means for inputting and storing data indicating details of an operation performed by the driver;

a feature data generating means for generating operation feature data of the driver based on the data stored by the operation storing means, according to a predetermined data generating procedure; and a driver identifying means for comparing the operation feature generated by the feature data generating means with preset feature data which has already been stored in a storage medium, and determining any identity between the compared operation and Preset feature data.

10. A computer-readable storage medium as claimed in claim 9, wherein the data input and stored by the operation storing means includes at least one of an operation amount and a degree of the operation.

11. A computer-readable storage medium as claimed in claim 9, wherein:

data indicating details of a plurality of operations performed by the driver are input and stored by the operation storing means; and some of the data stored by the operation storing means are extracted and combined by the feature data generating means so as to generate the operation feature data.

12. A computer-readable storage medium as claimed in claim 9, wherein the control program further comprises a control parameter reading means for reading out control parameters specific to a driver identified by the driver identifying means, from a storage device storing control parameters specific to each of the registered drivers.

13. A driver authentication apparatus as claimed in claim 1, wherein the data output from the operation detecting section relates to at least one of an operation of an accelerator pedal, an opening operation of a door lock, a closing operation of the door lock, an engine starting operation, an initial starting procedure, a steering operation, an operation of waiting for a traffic light, a vehicle acceleration operation, and a vehicle deceleration operation.

14. A driver authentication method as claimed in claim 5, wherein the data output from the operation detecting step relates to at least one of an operation of an accelerator pedal, an opening operation of a door lock, a closing operation of the door lock, an engine starting operation, an initial starting procedure, a steering operation, an operation of waiting for a traffic light, a vehicle acceleration operation, and a vehicle deceleration operation.

15. A computer-readable storage medium as claimed in claim 9, wherein the data stored by the operation detecting means relates to at least one of an operation of an accelerator pedal, an opening operation of a door lock, a closing operation of the door lock, an engine starting operation, an initial starting procedure, a steering operation, an operation of waiting for a traffic light, a vehicle acceleration operation, and a vehicle deceleration operation.

* * * * *

UNITED STATES PATENT AND TRADEMARK OFFICE
CERTIFICATE OF CORRECTION

PATENT NO. : 6,690,260 B1
DATED : February 10, 2004
INVENTOR(S) : Jun Ashihara

It is certified that error appears in the above-identified patent and that said Letters Patent is hereby corrected as shown below:

Title page,
Item [73], Assignee, change "Honda Giken Kabushiki Kaisha" to -- Honda Giken Kogyo Kabushiki Kaisha --.

Drawings,
Correct printed informal drawing sheets to formal drawing sheets for:
Sheet 1 of 5, Fig. 1;
Sheet 4 of 5, Figs. 5A and 5B; and
Sheet 5 of 5, Figs. 6A, 6B, 6C.

Column 1,
Line 67, change "present feature" to -- preset feature --.

Column 2,
Line 10, change "and generating the" to -- and generates the --.
Line 62, change "with the present" to -- with the preset --.

Column 3,
Line 12, change "generated in" to -- generated by --.
Line 51, change "authentication system using open" to -- authentication system using opening --.

Column 4,
Line 63, delete the second occurrence of "the time".

Column 8,
Line 67, change "details of each operation" to -- details of each said operation --.

Column 9,
Lines 2-3, change "gen-erating the feature" to -- generates the operation feature --.
Line 11, change "specific to the driver identified" to -- specific to a driver, as identified --.
Line 12, after "the feature data managing section" insert a comma.

UNITED STATES PATENT AND TRADEMARK OFFICE
CERTIFICATE OF CORRECTION

PATENT NO. : 6,690,260 B1
DATED : February 10, 2004
INVENTOR(S) : Jun Ashihara

It is certified that error appears in the above-identified patent and that said Letters Patent is hereby corrected as shown below:

Column 10,
Line 9, change "Preset feature" to -- preset feature --.

Signed and Sealed this

Seventh Day of September, 2004

JON W. DUDAS
*Director of the United States Patent and Trademark Office*

(12) United States Patent
Ashihara

(10) Patent No.: US 6,690,260 B1
(45) Date of Patent: Feb. 10, 2004

(54) DRIVER AUTHENTICATION APPARATUS AND METHOD FOR IDENTIFYING AUTOMATICALLY-EXTRACTED DRIVER'S OPERATION FEATURE DATA WITH ALREADY-REGISTERED FEATURE DATA

(75) Inventor: Jun Ashihara, Wako (JP)

(73) Assignee: Honda Giken Kabushiki Kaisha, Tokyo (JP)

(*) Notice: Subject to any disclaimer, the term of this patent is extended or adjusted under 35 U.S.C. 154(b) by 583 days.

(21) Appl. No.: 09/644,950

(22) Filed: Aug. 23, 2000

(30) Foreign Application Priority Data

Aug. 25, 1999 (JP) .............................. 11-238944

(51) Int. Cl.[7] .............................................. G05B 19/00
(52) U.S. Cl. .......................... 340/5.8; 340/5.2; 340/5.72; 701/35; 701/36; 701/49; 477/159; 477/183; 477/184; 477/186
(58) Field of Search ................... 340/5.8, 5.2, 5.72; 701/35, 49; 477/159, 183, 184, 186; 702/94

(56) References Cited

U.S. PATENT DOCUMENTS 5,499,182 A * 3/1996 Ousborne ............ 701/35
6,122,580 A * 9/2000 Autermann ........... 701/49
6,449,572 B1 * 9/2002 Kurz et al. ........... 702/94

FOREIGN PATENT DOCUMENTS

| JP | 03107354 | 5/1991 |
|---|---|---|
| JP | 08140294 | 5/1996 |
| JP | 10301755 A | 11/1998 |
| JP | 11122162 A | 4/1999 |
| JP | 11136911 | 5/1999 |
| WO | WO 94/01916 | 1/1994 |
| WO | WO 99/33156 | 7/1999 |

* cited by examiner

*Primary Examiner*—Michael Horabik
*Assistant Examiner*—Yves Dalencourt
(74) *Attorney, Agent, or Firm*—Carrier, Blackman & Associates, P.C.; Joseph P. Carrier; William D. Blackman

(57) ABSTRACT

A driver authentication apparatus and method permits a vehicle driver to be identified using a simpler method without using an ID card or the like, and without performing any special operation. The apparatus has a feature amount storing section for storing preset feature data of each registered driver; an operation detecting section for detecting an operation performed by the driver, and outputting data indicating details of the operation; and a feature data managing section for storing the data output from the operation detecting section and generating operation feature data of the driver based on the stored data, and comparing the operation feature data with the preset feature data stored in the feature amount storing section and determining any identity between the compared operation and preset feature data.

15 Claims, 5 Drawing Sheets